United States Patent [19]
Arechavaleta

[11] 3,791,784
[45] Feb. 12, 1974

[54] CONTINUOUS EXTRUSION MACHINE FOR MANUFACTURING PLASTIC NETS

[75] Inventor: D. Ignacio Aurrecoechia Arechavaleta, Bilbao, Spain

[73] Assignee: Triker S.A., Bilbao, Spain

[22] Filed: Nov. 13, 1972

[21] Appl. No.: 305,928

[30] Foreign Application Priority Data
Nov. 6, 1971  Spain .................................. 396735

[52] U.S. Cl........ 425/132, 425/382 N, 264/DIG. 81
[51] Int. Cl................................................ B29f 3/04
[58] Field of Search ....... 425/131, 132, 133, 382 N; 264/DIG. 81

[56] References Cited
UNITED STATES PATENTS

| | | | |
|---|---|---|---|
| 3,358,329 | 12/1967 | Martin et al. ................ | 425/382 NU |
| 3,584,341 | 6/1971 | Fairbanks ...................... | 425/131 X |
| 3,700,521 | 10/1972 | Gaffney .................. | 264/DIG. 81 X |
| 3,172,154 | 3/1965 | Martin et al. ...................... | 425/131 |
| 3,349,434 | 10/1967 | Hureau ........................ | 425/382 NU |

FOREIGN PATENTS OR APPLICATIONS
1,072,113   6/1967   Great Britain .............. 264/DIG. 81

*Primary Examiner*—R. Spencer Annear
*Attorney, Agent, or Firm*—Ostrolenk, Faber, Gerb & Soffen

[57] ABSTRACT

A continuous extrusion machine for manufacturing a net like mesh: the machine includes a circular housing having first and second adjacent outlets near its base; one extrusion outlet includes means for extruding longitudinal ribs which means is replaceably fastened at the end of the housing; the other extrusion outlet is shaped to produce transverse ribs and to deposit the transverse ribs on the longitudinal ribs; each outlet communicates with a separate extrusion pressure chamber, whereby two different materials may be extruded; blocking means at the exterior of the housing are shifted between a position which blocks the second outlet and one which opens the second outlet, thereby selectively cutting off or permitting flow out the second outlet to produce spaced transverse ribs.

7 Claims, 5 Drawing Figures

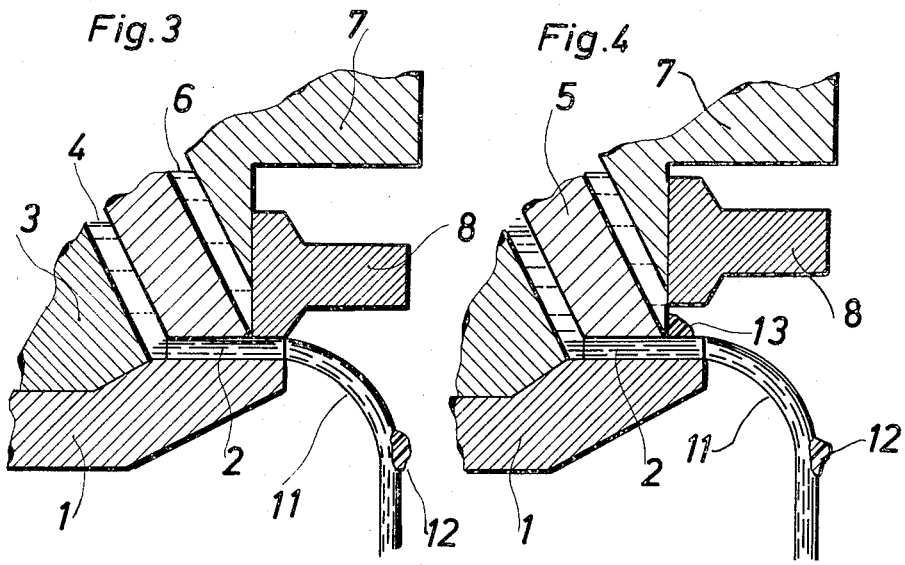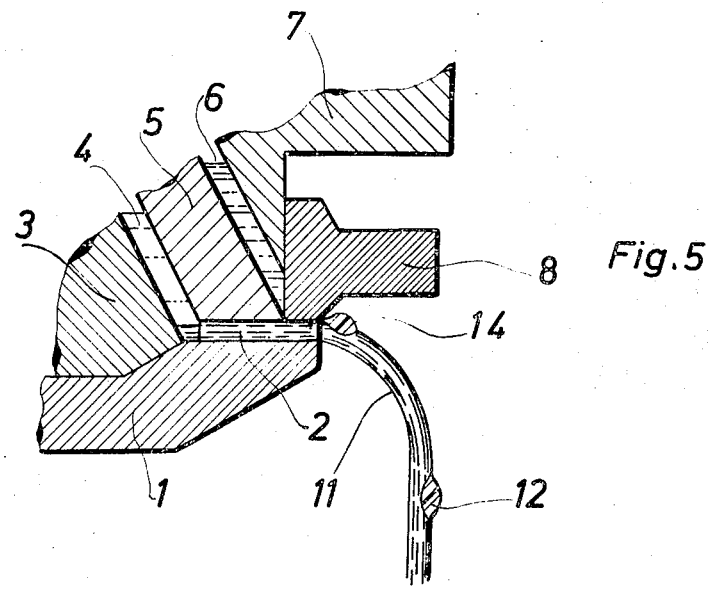

CONTINUOUS EXTRUSION MACHINE FOR MANUFACTURING PLASTIC NETS

The invention concerns, as its title indicates, an extrusion machine for plastic materials; more exactly the invention refers to a new continuous extrusion head, which is specifically designed to manufacture nets from plastic materials, which has a part which receives the plastic material in its centre part, apart from having another side entry of the same material coming from an extructor. The afore-mentioned part has a neck through which a course flows alternatively, in order to close, if wished, the output duct formed by said part and another one inside it, but suitably separated so as to let the plastic material flow, coming from the central hole.

The machine, and more specifically the continuous extrusion head to which the invention refers, has been conceived and forms an effective embodiment to put one of its aspects into practice, (the manufacture of plastic nets), of a new process for reciprocally combining plastic shapes.

The melted plastic reaches the ducts 9 and 10 from an independent extruder, entering the inside of the head shown in FIG. 1. Once the plastic material is inside the head, it flows through ducts 4 and 6 seeking the corresponding outlets.

The plastic material which precisely arrives by 9, and tries to leave through the teeth or grooves 2, after crossing ducts 4, always flows continuously, forming the threads 11. These threads shall have the same cross section which corresponds to the grooves 2, and the latter can be the same or different between themselves. As the part 1, which is the one which has the grooves, can easily be replaced, a head is provided which can manufacture different types of nets, although they will always be tubular and that, on cutting off the generant, will give rise to plates of a certain dimension or width.

The melted plastic which reaches 10 and is guided inside in this head by the ducts 6, is stopped from time to time due to the slidable row 8 which row 8 is moved by a piston with alternating movements, and precisely for this reason, it will let the plastic pass in the form of rings 13, which, on being injected direct on to the threads 11 which continually leave, are welded automatically to them.

Besides, at the time the plastic material is deposited, as shown in FIG. 4, the material 13 is drawn by the threads which continue to flow from the grooves 2.

The alternating movements of the course 8 are synchronized according to the separations there are to be between the circles 12 and 14 to form the net. Naturally this separation depends on the separations which the grooves 2 have between each other of the part 1.

The extruded threads which leave the head by the grooves 2 do so radially and then, through gravity, take the vertical position.

A further idea of the invention is given by the following description, in which reference is made to the illustrative plate of drawings attached to this report, in which, in a somewhat sketchy way, and exclusively by way of example, the preferred details of the invention are represented.

FIG. 1 is a general cross-section of the continuous extrusion head proposed, which, as can be seen, is a series of easily machined parts, as they are all revolving and therefore can be obtained by machining with a mechanical lathe.

FIG. 2 corresponds to a detail of the plates for the continuous extrusion of threads. This course can easily be changed and is duly fastened to part 3, after being seated onto the part 5.

FIG. 3 is a detail of the outlet cross section of the continuously formed threads.

FIG. 4 is a cross section detail to show the outlet position of the plastic material in the shape of circles 13, when the course 8 rises.

Figure 1:
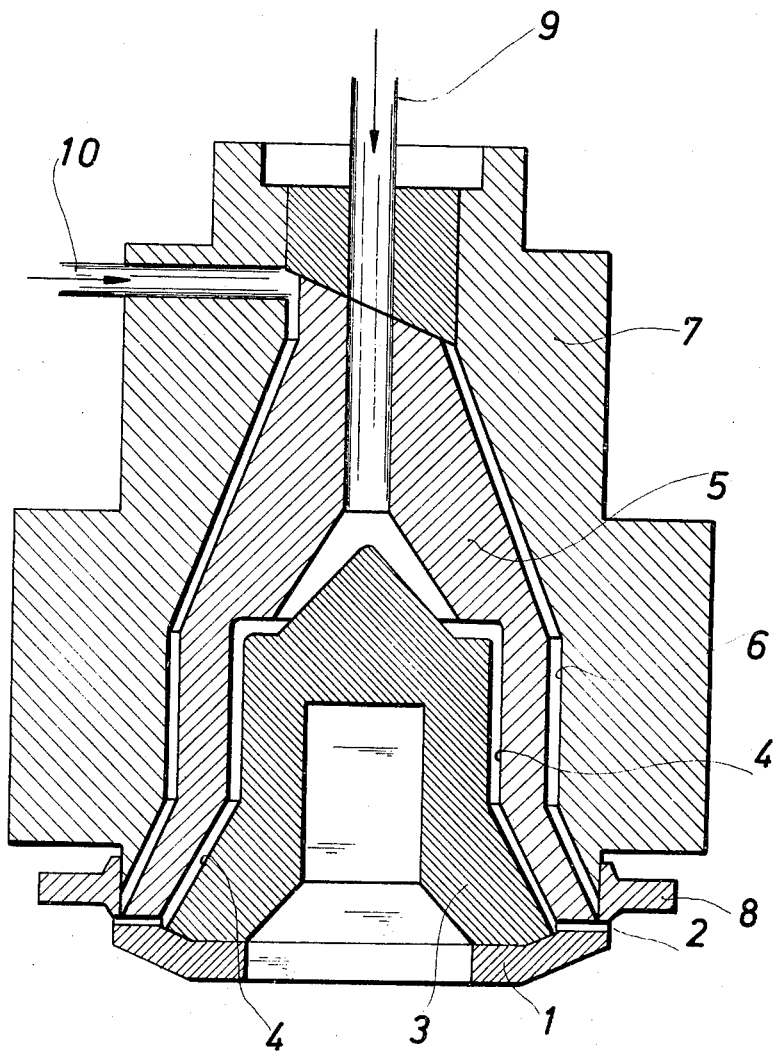
Figure 2:
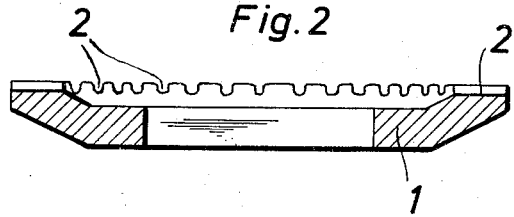

FIG. 5 is a cross-section detail when the course 8 lowers again and when at that time the circle 13 in FIG. 4 has passed to the position 14, forming the circle welded to the lengthwise threads 11.

The different parts of this head are described below, making reference to the attached drawings:

Number 1 indicates the changeable course, which has a series of radial grooves in one of its faces. This course is fastened by a support on the face of the course 5, to the part 3.

Number 2 shows the thread extrusion groove, which threads have the cross-section and separation best suited to each case.

Said part 3 which serves as a support to the course 1, and which together with the 5 form the inner ducts 4 for feeding the plastic which arrives by 9.

Number 4 indicates the duct which communicates the arrival of the plastic through 9 and the thread outlets by the grooves 2.

Number 5 indicates the part which has the hole in the middle to receive the plastic arriving through 9, which receives part 3 inside and forms with it the distribution duct 4, and outside receives the part 7, to form with it the other plastic supply duct 6 which arrives through the extruder which feeds 10, 6 being the plastic supply duct which arrives by 10.

Number 7 shows the outer part of the head, which has various duties:

To receive the arrival of the plastic by 9 and lead it independently through part 5 which is inside it.

To receive the plastic sideways by 10 and lead it to the duct which forms with the part housed inside it 5.

In its edge, it allows the course 8 to slide, so that the passage of the plastic can be opened or closed through 6.

To form in said outlet a perfect course, so that, together with the part 5, the outlet of the plastic 13 is determined, which is to form the circles of the net to be made.

Number 8 shows the sliding course, duly moving alternatively, 9 being the arrival of the plastic from one of the extruders and 10 the arrival of the plastic independently from 9.

It can be of the same or different material, all depending on the mechanical features it is wished to obtain in the net to be manufactured.

Number 11 indicates the plastic threads formed continuously,. 12 being the circles formed on the threads and which welded with them determine the cross components of the net.

Number 13 shows the moment the extruded circles leave.

Number 14 indicates the plastic circles which have become independent and already moulded onto the threads 11.

It is repeated that the object making up the present invention is susceptible to modifications in detail being made in it, which circumstances and practice make advisable, provided that with the variants introduced, the essential nature of the invention described is not altered or modified, and specified in the following claims.

I claim:

1. A continuous extrusion machine for manufacturing a net like mesh, which mesh is comprised of a first array of spaced apart filaments, and of a second array of spaced apart filaments all extending transversely to and intersecting the first array of filaments; said machine comprising:

a housing defining and surrounding a pressure chamber means;

a first outlet means from said chamber means to the exterior thereof; said first outlet means being shaped so as to cause extrusion of the first array of filaments, and also being continuously open;

a second outlet means from said chamber means to the exterior thereof; said second outlet means being shaped so as to cause extrusion of a filament of the second array of filaments each time said second outlet means is open; said second outlet means being positioned sufficiently close to said first outlet means as to deposit material extruded from said second outlet means on the material extruded from said first outlet means;

blocking means external to said chamber means and movable between a first position which blocks said second outlet means and a second position which unblocks said second outlet means.

2. The continuous extrusion machine of claim 1, further including an extrusion die in said chamber means, which said die includes said first and said second outlet means; said extrusion die being immovable during movement of said blocking means.

3. The continuous extrusion machine of claim 1, wherein said housing is generally annular and said first and second outlet means both exit to the annular periphery of said housing; said blocking means being around said housing annular periphery and being movable with respect to said housing.

4. The continuous extrusion machine of claim 3, wherein said first and second outlet means both exit from said housing adjacent to each other and said second outlet means is above said first outlet means.

5. The continuous extrusion machine of claim 1, wherein said chamber means includes a first pressure chamber communicating with said first outlet means and a separate second pressure chamber communicating with said second outlet means.

6. The continuous extrusion machine of claim 5, wherein said housing is generally annular and said first and second outlet means both exit to the annular periphery of said housing near an end of said housing; said blocking means being around said housing periphery;

said first chamber being closed off at said housing end by an annular closing die element which includes a filament shaping element having a plurality of grooves in it and said shaping element of said die element is in said first outlet means and partially blocks extrusion thereout and directs the extruded material into the form of the first filaments.

7. The continuous extrusion machine of claim 6, wherein said die element is removably attached at said end of said housing.

* * * * *